US012603359B2

(12) United States Patent
Zhu et al.

(10) Patent No.: US 12,603,359 B2
(45) Date of Patent: Apr. 14, 2026

(54) BATTERY THERMAL BARRIER SYSTEMS

(71) Applicant: FORD GLOBAL TECHNOLOGIES, LLC, Dearborn, MI (US)

(72) Inventors: Di Zhu, Novi, MI (US); Bhaskara Rao Boddakayala, Troy, MI (US); Jeffrey Charles Cowell, Canton, MI (US); Brian Utley, Canton, MI (US); Stefan Paul Pototschnik, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 696 days.

(21) Appl. No.: 18/047,458

(22) Filed: Oct. 18, 2022

(65) Prior Publication Data

US 2024/0128548 A1 Apr. 18, 2024

(51) Int. Cl.
| | |
|---|---|
| *H01M 10/658* | (2014.01) |
| *H01M 10/625* | (2014.01) |
| *H01M 10/653* | (2014.01) |
| *H01M 10/6555* | (2014.01) |
| *H01M 50/204* | (2021.01) |
| *H01M 50/291* | (2021.01) |

(Continued)

(52) U.S. Cl.
CPC ....... *H01M 10/658* (2015.04); *H01M 10/625* (2015.04); *H01M 10/653* (2015.04); *H01M 10/6555* (2015.04); *H01M 50/204* (2021.01); *H01M 50/291* (2021.01); *H01M 50/293* (2021.01); *H01M 50/512* (2021.01); *H01M 2220/20* (2013.01)

(58) Field of Classification Search
CPC ............. H01M 10/658; H01M 50/289; H01M 50/291; H01M 50/293
See application file for complete search history.

(56) References Cited

U.S. PATENT DOCUMENTS

| | | | |
|---|---|---|---|
| 8,875,828 B2 | 11/2014 | Rawlinson et al. | |
| 2014/0335398 A1 | 11/2014 | Partin et al. | |
| 2015/0064514 A1 | 3/2015 | Wu et al. | |

(Continued)

FOREIGN PATENT DOCUMENTS

| | | | | |
|---|---|---|---|---|
| CN | 106654462 A | * | 5/2017 | .......... H01M 10/658 |
| CN | 111373600 A | * | 7/2020 | ........ H01M 10/6555 |

(Continued)

OTHER PUBLICATIONS

Machine Translation of CN-111373600-A (Year: 2020).*
Machine Translation of DE-102021005536-A1 (Year: 2021).*
Machine Translation of CN-106654462-A (Year: 2017).*

*Primary Examiner* — Gregg Cantelmo
(74) *Attorney, Agent, or Firm* — David B. Kelley; Carlson, Gaskey & Olds, P.C.

(57) ABSTRACT

Exemplary thermal barrier systems are provided for traction battery packs. Exemplary battery thermal barrier systems may include one or more thermal barrier structures that are positioned between neighboring groupings of battery cells of a cell bank and/or elsewhere within a battery array of the traction battery pack. The thermal barrier structures may include a foam-insulation-foam multi-layer structure, an insulation-foam-insulation multi-layer structure, or an insulation-foam multi-layer structure. The thermal barrier structures are designed to manage cell-to-cell transfers of heat and electrical energy during battery thermal events.

20 Claims, 5 Drawing Sheets

(51) Int. Cl.
    *H01M 50/293*     (2021.01)
    *H01M 50/512*     (2021.01)

(56)            References Cited

U.S. PATENT DOCUMENTS

| | | |
|---|---|---|
| 2016/0254578 A1 | 9/2016 | Liu et al. |
| 2020/0321575 A1* | 10/2020 | Terauchi ............. H01M 50/224 |
| 2020/0335737 A1 | 10/2020 | Hilligoss et al. |
| 2021/0257690 A1 | 8/2021 | Kilhenney et al. |
| 2021/0320345 A1* | 10/2021 | Yoon ................... H01M 10/655 |
| 2022/0013825 A1 | 1/2022 | De Wilde et al. |
| 2022/0021074 A1 | 1/2022 | Mabrey et al. |
| 2022/0166106 A1 | 5/2022 | Zhang et al. |
| 2022/0200079 A1 | 6/2022 | Boddakayala et al. |

FOREIGN PATENT DOCUMENTS

| | | | |
|---|---|---|---|
| DE | 102017009712 A1 | 4/2018 | |
| DE | 102021002378 A1 | 12/2021 | |
| DE | 102021005536 A1 * | 12/2021 | .......... H01M 10/659 |
| WO | WO-2018011384 A1 * | 1/2018 | ........... H01M 50/24 |
| WO | 2020083331 A1 | 4/2020 | |
| WO | 2021209187 A1 | 10/2021 | |
| WO | 2022018739 A1 | 1/2022 | |

* cited by examiner

BATTERY THERMAL BARRIER SYSTEMS

TECHNICAL FIELD

This disclosure relates generally to electrified vehicle traction battery packs, and more particularly to thermal barrier systems for managing cell-to-cell transfers of heat and electrical energy during battery thermal events.

BACKGROUND

Electrified vehicles are designed to reduce or completely eliminate reliance on internal combustion engines. In general, electrified vehicles differ from conventional motor vehicles because they are selectively driven by battery powered electric machines. Conventional motor vehicles, by contrast, rely exclusively on the internal combustion engine to propel the vehicle.

A high voltage traction battery pack typically powers the electric machines and other electrical loads of the electrified vehicle. The traction battery pack includes a plurality of battery cells and various other battery internal components that support the electric propulsion of electrified vehicles.

SUMMARY

A battery thermal barrier system according to an exemplary aspect of the present disclosure includes, among other things, a cell stack including a first battery cell and a second battery cell. The first battery cell and the second battery cell are electrically connected in parallel. A thermal barrier structure is arranged between the first battery cell and the second battery cell.

In a further non-limiting embodiment of the foregoing battery thermal barrier system, the thermal barrier structure includes an insulation layer sandwiched between a first foam layer and a second foam layer.

In a further non-limiting embodiment of either of the foregoing battery thermal barrier systems, the insulation layer includes a mica, a sheet moulding compound (SMC), or phenolic.

In a further non-limiting embodiment of any of the foregoing battery thermal barrier systems, the insulation layer includes refractory ceramic fibers (RCF).

In a further non-limiting embodiment of any of the foregoing battery thermal barrier systems, the thermal barrier structure includes a foam layer sandwiched between a first insulation layer and a second insulation layer.

In a further non-limiting embodiment of any of the foregoing battery thermal barrier systems, the first and second insulation layers each include refractory ceramic fibers (RCF).

In a further non-limiting embodiment of any of the foregoing battery thermal barrier systems, the thermal barrier structure includes an insulation layer and a foam layer.

In a further non-limiting embodiment of any of the foregoing battery thermal barrier systems, the insulation layer includes refractory ceramic fibers (RCF).

In a further non-limiting embodiment of any of the foregoing battery thermal barrier systems, the cell stack is arranged between a first end plate and a second end plate.

In a further non-limiting embodiment of any of the foregoing battery thermal barrier systems, a second thermal barrier structure is arranged between the first end plate and the cell stack, and a third thermal barrier structure is arranged between the second end plate and the cell stack.

In a further non-limiting embodiment of any of the foregoing battery thermal barrier systems, each of the second thermal barrier structure and the third thermal barrier structure includes an insulation layer and a foam layer.

In a further non-limiting embodiment of any of the foregoing battery thermal barrier systems, the cell stack includes a first cell bank and a second cell bank. A second thermal barrier structure is arranged between the first cell bank and the second cell bank.

A battery thermal barrier system according to another exemplary aspect of the present disclosure includes, among other things, a battery array including a cell stack positioned between a first end plate and a second end plate. The cell stack includes a first battery cell and a second battery cell that are electrically connected in parallel. A first thermal barrier structure is arranged between the first battery cell and the second battery cell. A second thermal barrier structure is arranged between the cell stack and the first end plate or the second end plate.

In a further non-limiting embodiment of the foregoing battery thermal barrier system, a third thermal barrier structure is arranged between the cell stack and the other of the first end plate or the second end plate.

In a further non-limiting embodiment of either of the foregoing battery thermal barrier systems, the cell stack includes a first cell bank and a second cell bank. A second first thermal barrier structure is arranged between the first cell bank and the second cell bank.

In a further non-limiting embodiment of any of the foregoing battery thermal barrier systems, the first thermal barrier structure includes an insulation layer sandwiched between a first foam layer and a second foam layer.

In a further non-limiting embodiment of any of the foregoing battery thermal barrier systems, the first thermal barrier structure includes a foam layer sandwiched between a first insulation layer and a second insulation layer.

In a further non-limiting embodiment of any of the foregoing battery thermal barrier systems, the first and second insulation layers include refractory ceramic fibers (RCF).

In a further non-limiting embodiment of any of the foregoing battery thermal barrier systems, the first thermal barrier structure includes an insulation layer and a foam layer.

In a further non-limiting embodiment of any of the foregoing battery thermal barrier systems, the insulation layer includes refractory ceramic fibers (RCF).

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary thermal barrier systems for traction battery packs. Exemplary battery thermal barrier systems may include one or more thermal barrier structures that are positioned between neighboring groupings of battery cells of a cell bank and/or elsewhere within a battery array of the traction battery pack. The thermal barrier structures may include a foam-insulation-foam multi-layer structure, an insulation-foam-insulation multi-layer structure, or an insulation-foam multi-layer structure. The thermal barrier structures are designed to manage cell-to-cell transfers of heat and electrical energy during battery thermal events. These and other features are discussed in greater detail in the following paragraphs of this detailed description.

Figure 1:
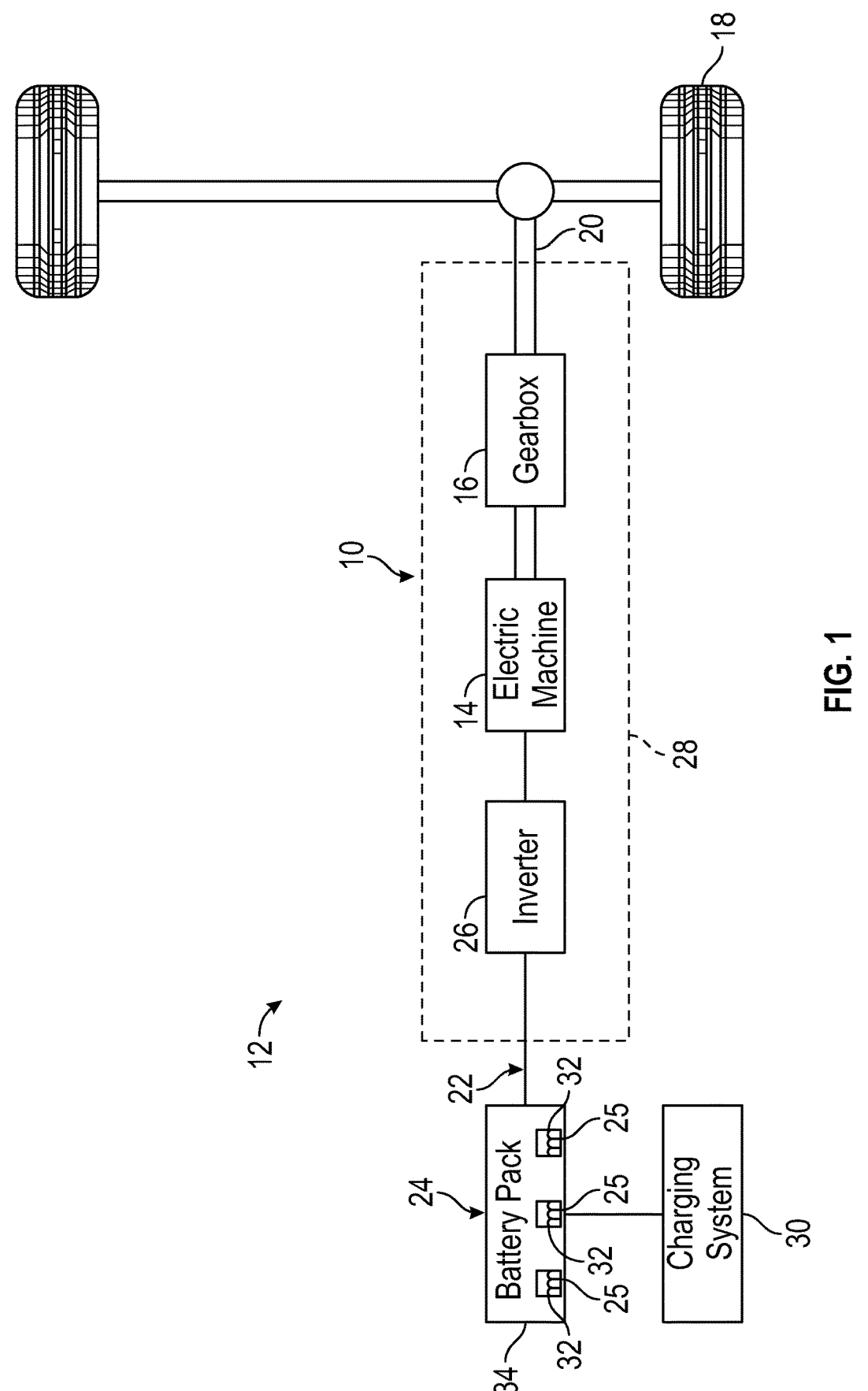
FIG. 1 schematically illustrates a powertrain of an electrified vehicle.

FIG. 1 schematically illustrates a powertrain 10 of an electrified vehicle 12. In an embodiment, the electrified vehicle 12 is a battery electric vehicle (BEV). However, it should be understood that the concepts described herein are not limited to BEVs and could extend to other electrified vehicles, including, but not limited to, hybrid electric vehicles (HEVs), plug-in hybrid electric vehicles (PHEVs), fuel cell vehicles, etc. Although not shown in this exemplary embodiment, the electrified vehicle 12 could be equipped with an internal combustion engine that can be employed either alone or in combination with other energy sources to propel the electrified vehicle 12.

In the illustrated embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output torque. The electric machine 14 may be connected to a gearbox 16 for adjusting the output torque and speed of the electric machine 14 by a predetermined gear ratio. The gearbox 16 may be operably connected to a set of drive wheels 18 by an output shaft 20.

A voltage bus 22 electrically connects the electric machine 14 to a traction battery pack 24 through an inverter 26, which can also be referred to as an inverter system controller (ISC). The electric machine 14, the gearbox 16, and the inverter 26 may be collectively referred to as a transmission 28 of the electrified vehicle 12.

The traction battery pack 24 is an exemplary electrified vehicle battery. The traction battery pack 24 may be a high voltage traction battery pack that includes one or more battery arrays 25 (i.e., battery assemblies, battery modules, or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The one or more battery arrays 25 of the traction battery pack 24 may each include a plurality of battery cells 32 that store energy for powering various electrical loads of the electrified vehicle 12. The traction battery pack 24 could employ any number of battery cells 32 within the scope of this disclosure. Accordingly, this disclosure should not be limited to the specific configuration shown in FIG. 1.

In an embodiment, the battery cells 32 are lithium-ion cells. However, other cell chemistries (nickel-metal hydride, lithium-iron phosphate, etc.) could alternatively be utilized within the scope of this disclosure.

In another embodiment, the battery cells 32 are prismatic or pouch battery cells. However, other cell geometries could alternatively be utilized within the scope of this disclosure.

An enclosure assembly 34 may house the battery arrays 25 of the traction battery pack 24. In an embodiment, the enclosure assembly 34 is a sealed outer enclosure that establishes the outermost surfaces of the traction battery pack 24. The enclosure assembly 34 may include any size, shape, and configuration within the scope of this disclosure. The battery arrays 25 and other battery internal components of the traction battery pack 24 are separate structures from the enclosure assembly 34 and therefore are not considered to established any portion of the outermost surfaces of the traction battery pack 24.

The electrified vehicle 12 may further include a charging system 30 for charging the energy storage devices (e.g., the battery cells 32) of the traction battery pack 24. The charging system 30 may include charging components that are located both onboard the electrified vehicle 12 (e.g., a vehicle charge port assembly, etc.) and external to the electrified vehicle 12 (e.g., electric vehicle supply equipment (EVSE), etc.). The charging system 30 can be connected to an external power source (e.g., a grid power source) for receiving and distributing power received from the external power source throughout the electrified vehicle 12.

The powertrain 10 depicted by FIG. 1 is highly schematic and is not intended to limit this disclosure. Various additional components could alternatively or additionally be employed by the powertrain 10 within the scope of this disclosure.

From time to time, pressure and thermal energy within one or more of the battery cells 32 can increase. The pressure and thermal energy increase can be due to an overcharge condition or an overdischarging condition, for example. The pressure and thermal energy increase can cause the associated battery cell 32 to rupture and release gas from its interior. The gases may be caused by an applied force or a thermal event, and can either cause or exacerbate an existing battery thermal event. A relatively significant amount of heat can be generated during battery thermal events, and this heat can sometimes cascade from cell-to-cell within the traction battery pack 24. This disclosure is therefore directed to battery thermal barrier systems for mitigating the effects of battery thermal events.

Figure 2:
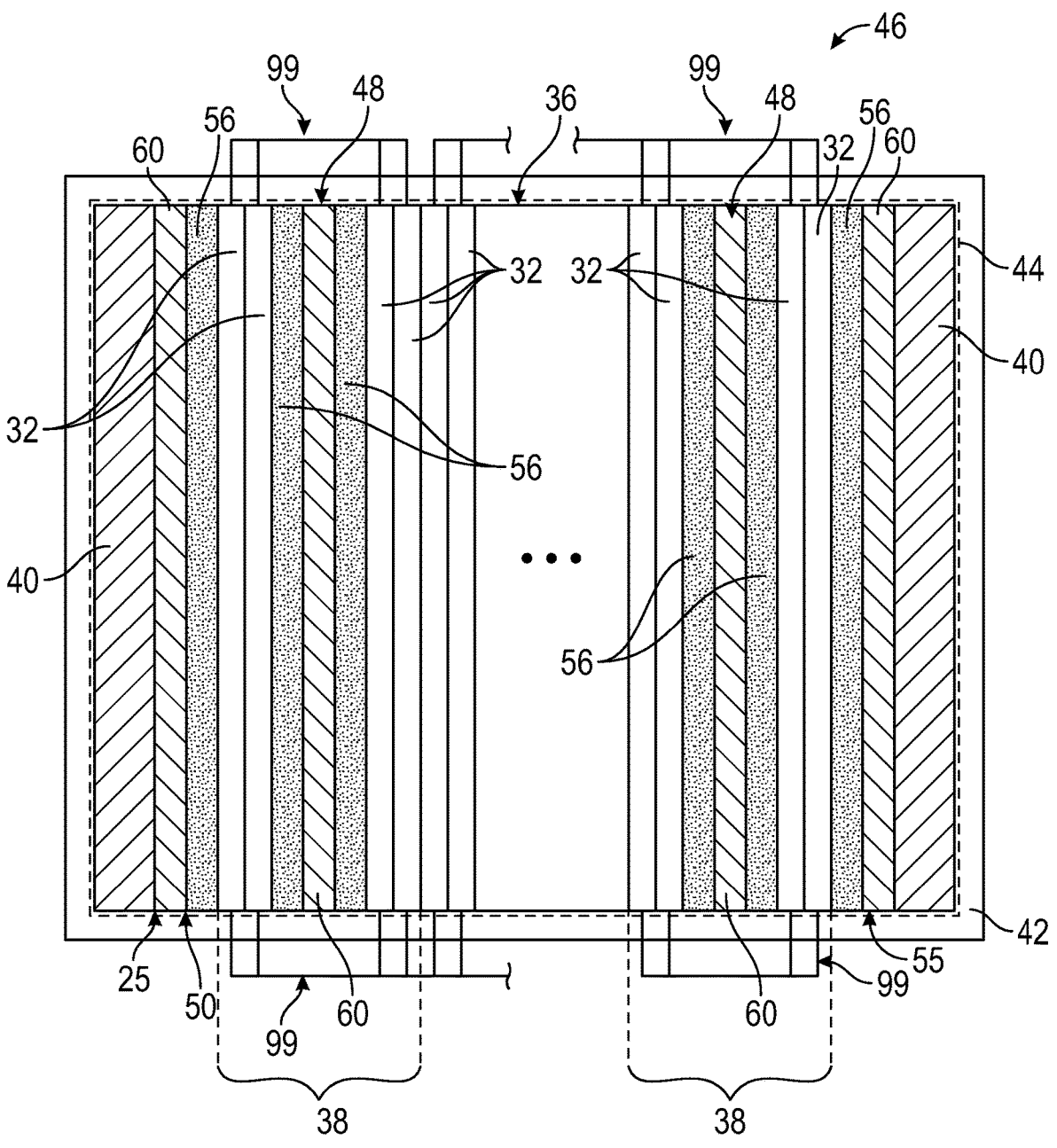
FIG. 2 illustrates an exemplary thermal barrier system for a battery array of a traction battery pack.

FIG. 2 illustrates an exemplary battery array 25 for a traction battery pack, such as the traction battery pack 24 of FIG. 1, for example. As explained in further detail below, the battery array 25 may incorporate thermal barrier features designed for mitigating or even preventing the effects of battery thermal events.

The battery array 25 may include a plurality of battery cells 32. The total number of battery cells 32 provided within the battery array 25 may vary and is not intended to limit this disclosure. The battery cells 32 may be grouped together in a cell stack 36, which itself may include two or more cell banks 38. In the illustrated embodiment, each cell bank 38 includes a total of four battery cells 32 that are electrically connected in parallel to one another, and adjacent cell banks 38 may be connected in series. The electrical connections between the battery cells 32 of each cell bank 38 are schematically depicted at reference numeral 99. However, the cell banks 38, and thus the cell stack 36, could include any number of battery cells within the scope of this disclosure, and the cell banks 38 could be electrically connected to provide either a series string configuration or a parallel string configuration.

The cell stack 36 may be packaged between a pair of end plates 40. The end plates 40 may establish portions of a support structure of the battery array 25. Although not specifically shown, the support structure could additionally include side plates, a top plate, and/or a bottom plate.

The cell stack 36 may be arranged to interface with a heat exchanger plate 42 (e.g., a liquid cooled cold plate). A coolant, such as water mixed with ethylene glycol or any other suitable coolant, may be circulated through an interior cooling circuit of the heat exchanger plate 42. The coolant may pick up heat that is generated within the battery cells 32 as it circulates through the internal cooling circuit of the heat exchanger plate 42.

A thermal interface material 44 (e.g., epoxy resin, silicone based materials, thermal greases, etc.) may be disposed between the battery cells 32 of the cell stack 36 and the heat exchanger plate 42 for facilitating heat transfer therebetween.

The battery array 25 may further include or be part of a thermal barrier system 46 (hereinafter referred to simply as "the system 46") for mitigating the effects of battery thermal events. For example, among other benefits, the system 46 may be configured to prolong the amount of time it takes for electrical energy and heat to transfer from cell-to-cell within the cell stack 36 during battery thermal events. The system 46 may further prolong the amount of time it takes for heat to transfer through thermally conductive connections of the battery array 25 during battery thermal events.

The system 46 may include a plurality of first thermal barrier structures 48 that are incorporated into the cell stack 36. The first thermal barrier structures 48 may be positioned at various locations along the length of the cell stack 36 and are adapted for slowing or even preventing cell-to-cell propagation during battery thermal events. In an embodiment, each cell bank 38 of the cell stack 36 may include at least one first thermal barrier structure 48 positioned therein, with the first thermal barrier structure 48 being positioned between adjacent battery cells 32 of the cell bank 38. In an embodiment, one first thermal barrier structure 48 is disposed at the mid-point of each cell bank 38. However, other configurations are also contemplated, and therefore the total number of first thermal barrier structures 48 provided as part of the cell stack 36 is not intended to limit this disclosure.

One or more of the substituent layers of the first thermal barrier structure 48 may be wider and/or taller than the respective width or height of the battery cells 32. The extension portions of the first thermal barrier structure 48 may therefore function to block debris from transferring from cell-to-cell.

Figure 3:
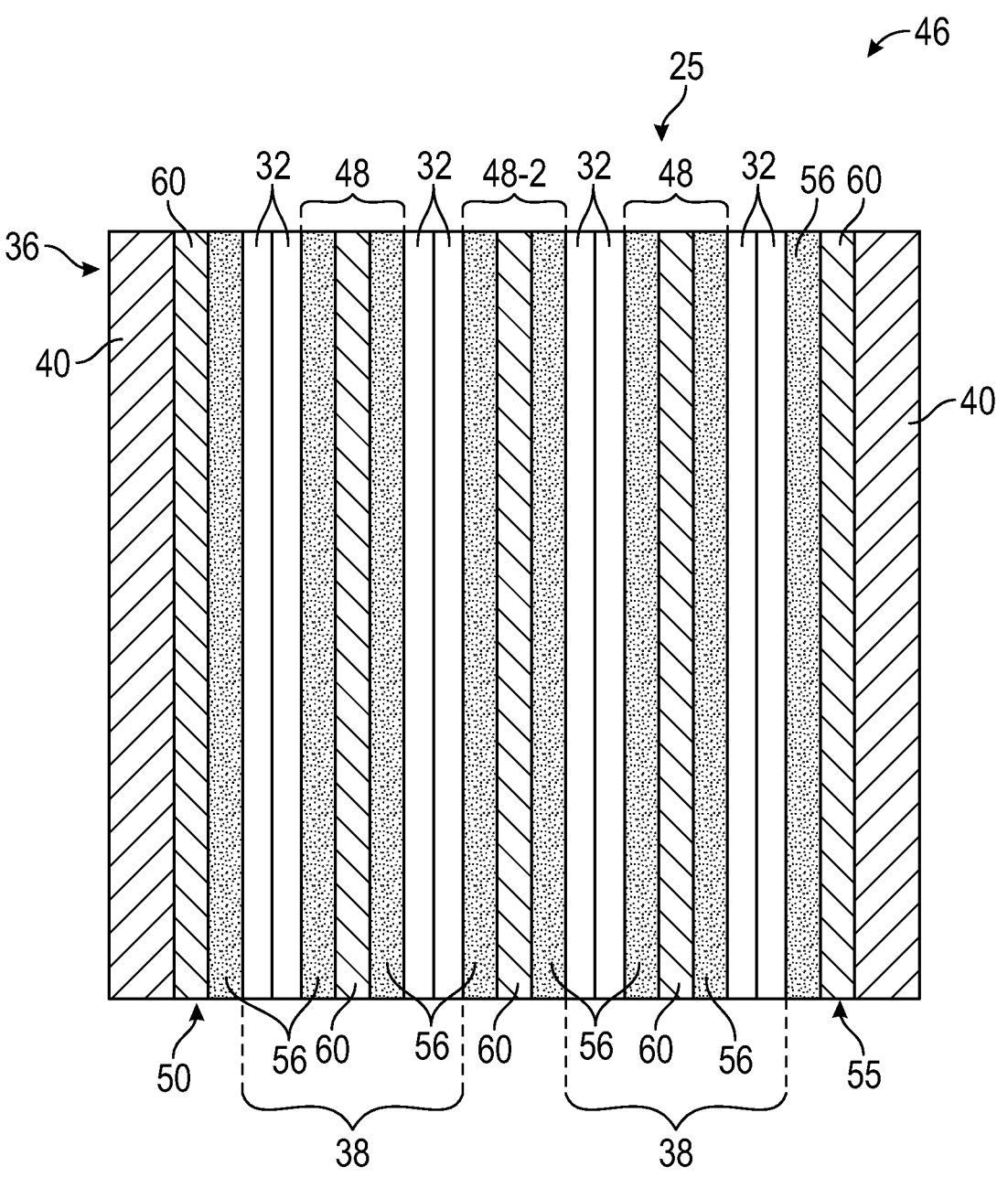
FIG. 3 illustrates another exemplary thermal barrier system for a battery array of a traction battery pack.

In another embodiment, a second first thermal barrier structure 48-2 may additionally be positioned axially between adjacent cell banks 38 of the cell stack 36 (see, e.g., FIG. 3). In such an embodiment, the second first thermal barrier structure 48-2 may act as a partition between adjacent cell banks 38 of the cell stack 36.

Each first thermal barrier structure 48 of the system 46 may include a multi-layered sandwich structure, with each layer of the structure having a unique function associated with mitigating the effects of battery thermal events. In an embodiment, the first thermal barrier structure 48 may include a pair of foam layers 56 and an insulation layer 60 sandwiched between the foam layers 56. In another embodi-

Figure 4:
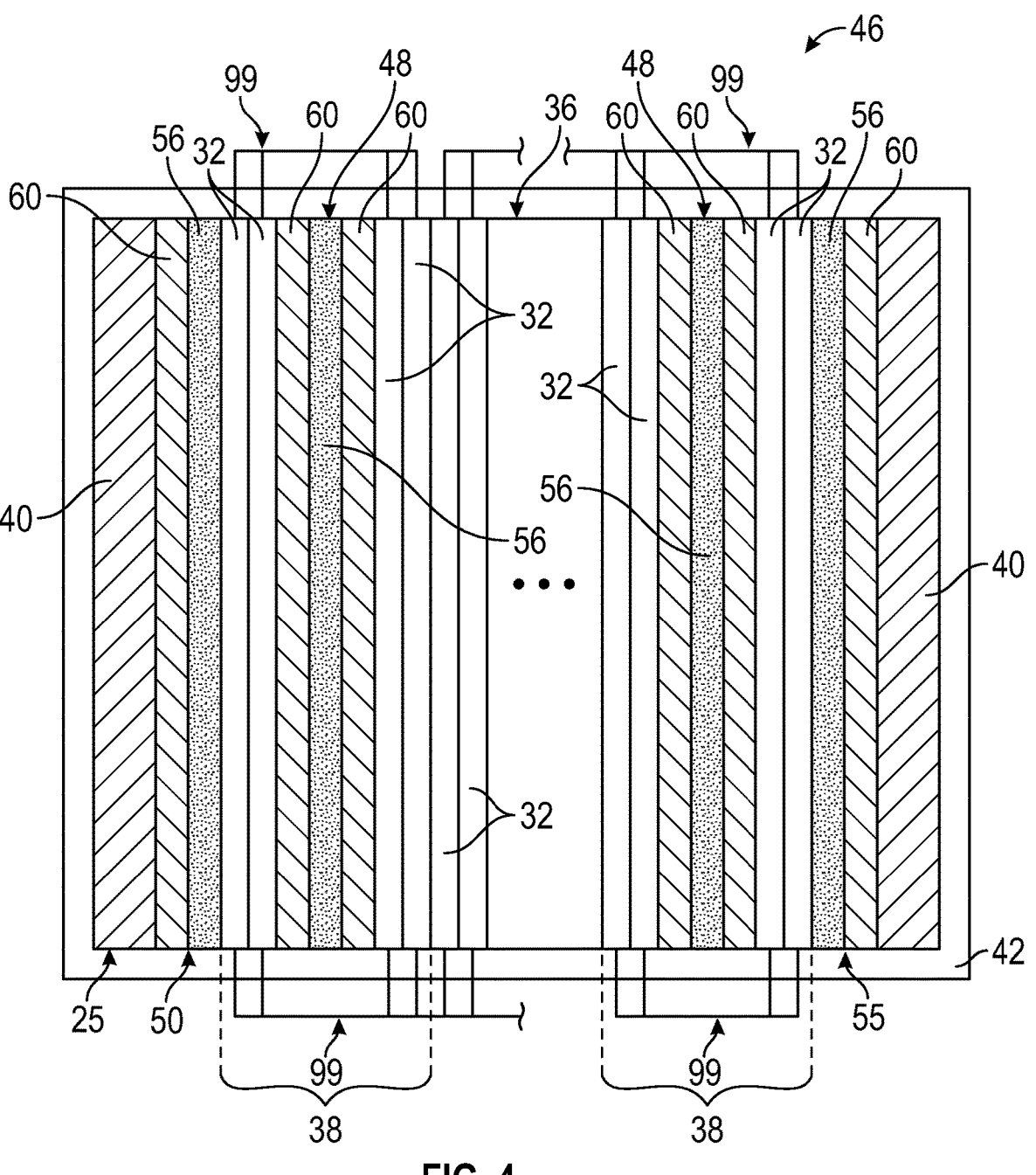
FIG. 4 illustrates yet another exemplary thermal barrier system for a battery array of a traction battery pack.

6 ment, the first thermal barrier structure 48 may include a pair of insulation layers 60 and a foam layer 56 sandwiched between the insulation layers 60 (see FIG. 4). Notably, the various layers of the first thermal barrier structure 48 are not drawn to scale, and in the interests of simplicity and clarity, are shown in a highly schematic manner in the various figures.

In an embodiment, the foam layer(s) 56 of each first thermal barrier structure 48 are configured as polyurethane foam sheets. In another embodiment, the foam layer(s) 56 of each first thermal barrier structure 48 are configured as acrylic closed cell foam sheets. However, the foam layers 56 could be constructed from other materials or combinations of materials within the scope of this disclosure.

The foam layers 56 may be configured to absorb stress loads exerted by the cell banks 38, such as during expansion and contraction of the battery cells 32, for example. The foam plates 56 may thus reduce the loads acting on neighboring battery cells 32 throughout the operable life of the battery array 25. The foam plates 56 may further function to establish a seal between neighboring cell banks 38.

In an embodiment, the insulation layer(s) 60 of each first thermal barrier structure 48 are configured as mica, sheet moulding compound (SMC), or phenolic sheets. In another embodiment, the insulation layer(s) 60 of each first thermal barrier structure 48 are configured as refractory ceramic fiber (RCF) sheets. However, the insulation layers 60 could be constructed from other materials or combinations of materials within the scope of this disclosure.

By providing the first thermal barrier structure 48 between neighboring battery cells 32 that are electrically connected in parallel within each cell bank 38 of the cell stack 36, the amount of time required for electrical energy to be transferred to the battery cell(s) 32 experiencing the battery thermal event can be prolonged. As a result, the next battery cell 32 in the parallel configuration can enter the battery thermal event at a lower state of charge.

The overall thickness of the first thermal barrier structure 48 can be varied to dictate discharge duration of the battery cells 32. Moreover, when one of the battery cells 32 is discharging, the heat can be absorbed by the anode of that cell. A neighboring battery cell 32 may function like a resistor to draw current from the other parallel cells, thereby reducing their energy levels and temperatures.

Moreover, positioning the first thermal barrier structures 48 near the mid-point of each cell bank 38 prolongs the amount of time it takes for heat to transfer through thermally conductive connections, thereby prolonging propagation time and/or arresting thermal propagation to a minimum number of battery cells 32 of the cell stack 36.

The system 46 may additionally include a second thermal barrier structure 50 and a third thermal barrier structure 55 that can be incorporated into the cell stack 36. In an embodiment, second thermal barrier structure 50 may be positioned between the cell stack 36 and one of the end plates 40, and the third thermal barrier structure 55 may be positioned between the cell stack 36 and the other end plate 40.

Each of the second and third thermal barrier structures 50, 55 may include a multi-layered sandwich structure, with each layer of the structure having a unique function associated with mitigating the effects of battery thermal events. In an embodiment, the second thermal barrier structure 50 may include a foam layer 56 and an insulation layer 60. The insulation layer 60 may be positioned in contact with one of the end plates 40, and the foam layer 56 may be positioned in contact with one of the cell stacks 38. Notably, the various layers of the second and third thermal barrier structures 50, 55 are not drawn to scale, and in the interests of simplicity and clarity, are shown in a highly schematic manner in the various figures.

The foam layer 56 and the insulation layer 60 of the second thermal barrier structure 50 are configured to be similar to the same respective parts described above with reference to the first thermal barrier structures 48. Therefore, the respective design and function of these layers are not repeated here.

Figure 5:
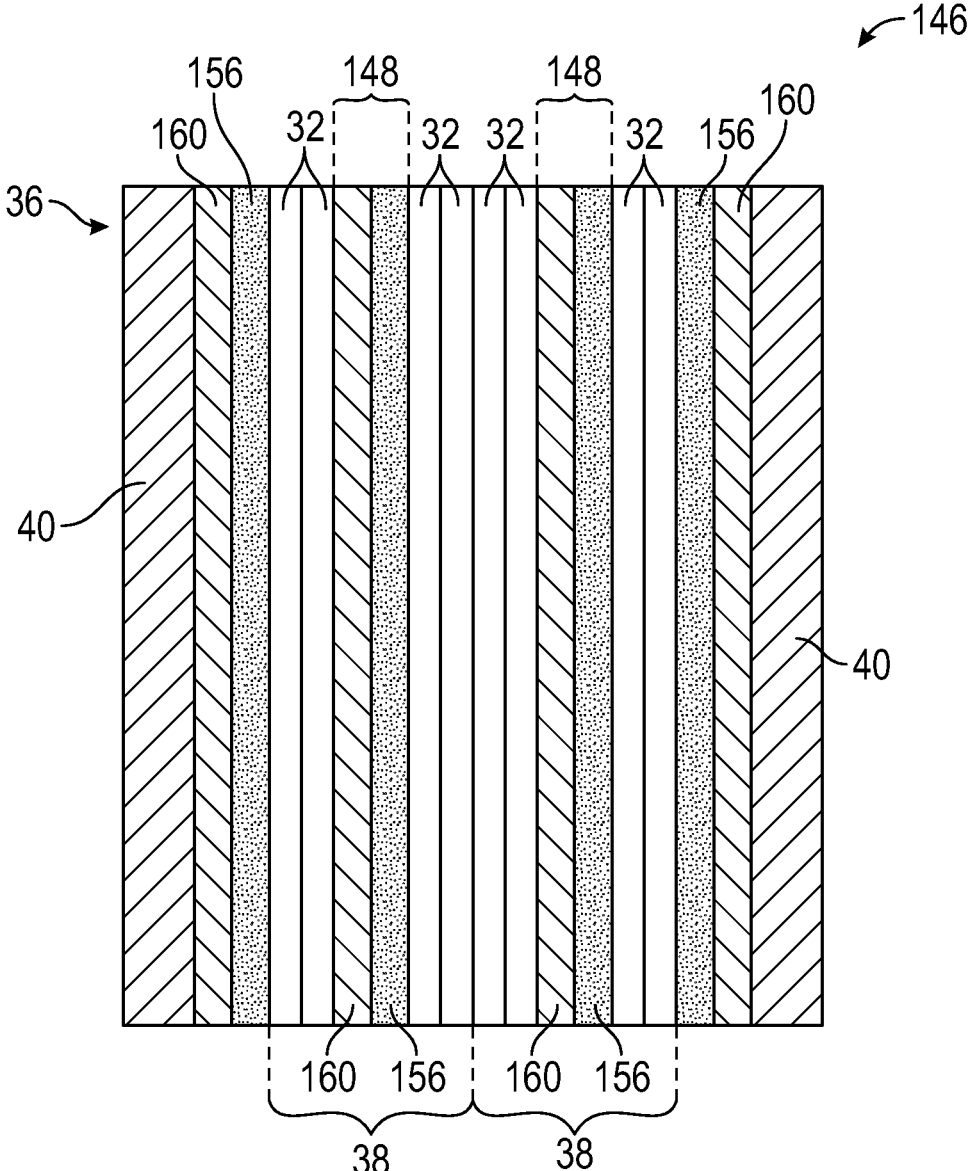
FIG. 5 illustrates yet another exemplary thermal barrier system for a battery array of a traction battery pack.

FIG. 5 illustrates another exemplary thermal barrier system 146. The system 146 may include a plurality of first thermal barrier structures 148 that are incorporated into the cell stack 36. The first thermal barrier structures 148 may be positioned at various locations along the length of the cell stack 36 and are adapted for slowing or even preventing cell-to-cell propagation during battery thermal events. In an embodiment, each cell bank 38 of the cell stack 36 may include at least one first thermal barrier structure 148 positioned therein, with the first thermal barrier structure 148 being positioned between adjacent battery cells 32 of the respective cell bank 38. In an embodiment, one first thermal barrier structure 148 is disposed at the mid-point of each cell bank 38.

In this embodiment, the first thermal barrier structure 148 includes an insulation layer 160 and a foam layer 156. The first thermal barrier structure 148 can thus employ two layers rather than the three-layered configurations discussed above. The two-layered configuration may be particularly beneficial when the overall length footprint of the battery array 25 is a design constraint.

In an embodiment, the insulation layer 160 includes refractory ceramic fibers (RCF), and the foam layer 156 includes polyurethane foam. However, other materials or combinations of materials could also be used within the scope of this disclosure.

The exemplary battery thermal barrier systems of this disclosure are designed to mitigate the effects of battery thermal events inside electrified vehicle traction battery arrays/packs. The systems may provide numerous advantages over known solutions, including but not limited to presenting a novel configuration that significantly slows or even prevents cell-to-cell propagation at a minimum energy content.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery thermal barrier system, comprising:
a cell stack including a first battery cell and a second battery cell, wherein the first battery cell and the second battery cell are electrically connected in parallel within a common cell bank of the cell stack; and a thermal barrier structure arranged directly between the first battery cell and the second battery cell to prolong an amount of time required for thermal and electrical energy to be transferred between the first battery cell and the second battery cell during a thermal event.

2. The battery thermal barrier system as recited in claim 1, wherein the thermal barrier structure includes an insulation layer sandwiched between a first foam layer and a second foam layer.

3. The battery thermal barrier system as recited in claim 2, wherein the insulation layer includes a mica, a sheet moulding compound (SMC), or phenolic.

4. The battery thermal barrier system as recited in claim 1, wherein the cell stack is arranged between a first end plate and a second end plate.

5. The battery thermal barrier system as recited in claim 4, comprising a second thermal barrier structure arranged between the first end plate and the cell stack and a third thermal barrier structure arranged between the second end plate and the cell stack.

6. The battery thermal barrier system as recited in claim 5, wherein each of the second thermal barrier structure and the third thermal barrier structure includes an insulation layer and a foam layer.

7. The battery thermal barrier system as recited in claim 1, wherein the cell stack includes a first cell bank and a second cell bank, and further comprising a second thermal barrier structure arranged between the first cell bank and the second cell bank.

8. The battery thermal barrier system as recited in claim 1, wherein the common cell bank includes the first battery cell, the second battery cell, a third battery cell, and a fourth battery cell, and the first battery cell, the second battery cell, the third battery cell, and the fourth battery cell are electrically connected in parallel with one another.

9. The battery thermal barrier system as recited in claim 8, wherein the cell stack includes a second cell bank that is electrically connected in series with the common cell bank.

10. The battery thermal barrier system as recited in claim 8, wherein an additional thermal barrier structure is not positioned between the first battery cell and the third battery cell or between the second battery cell and the fourth battery cell.

11. The battery thermal barrier system as recited in claim 1, wherein the thermal barrier structure is arranged at a mid-point of the common cell bank.

12. The battery thermal barrier system as recited in claim 2, wherein the first foam layer and the second foam layer are polyurethane foam sheets.

13. The battery thermal barrier system as recited in claim 2, wherein the first foam layer and the second foam layer are acrylic closed cell foam sheets.

14. The battery thermal barrier system as recited in claim 2, wherein the insulation layer includes a sheet moulding compound (SMC) or a phenolic sheet.

15. The battery thermal barrier system as recited in claim 1, wherein the thermal barrier structure is a multi-layered structure, and at least one substituent layer of the multi-layered structure is either wider or taller than a respective width or height of the first battery cell or the second battery cell.

16. A battery thermal barrier system, comprising:
a battery array including a cell stack positioned between a first end plate and a second end plate;

wherein the cell stack includes a first battery cell and a second battery cell that are electrically connected in parallel within a common cell bank of the cell stack;

a first thermal barrier structure arranged directly between the first battery cell and the second battery cell and including a multi-layered configuration adapted to prolong an amount of time required for thermal and electrical energy to be transferred between the first battery cell and the second battery cell during a thermal event; and a second thermal barrier structure arranged between the cell stack and the first end plate or the second end plate.

17. The battery thermal barrier system as recited in claim 16, comprising a third thermal barrier structure arranged between the cell stack and the other of the first end plate or the second end plate.

18. The battery thermal barrier system as recited in claim 16, wherein the cell stack includes a first cell bank and a second cell bank, and further comprising a second first thermal barrier structure arranged between the first cell bank and the second cell bank.

19. The battery thermal barrier system as recited in claim 16, wherein the first thermal barrier structure includes an insulation layer sandwiched between a first foam layer and a second foam layer.

20. A battery thermal barrier system, comprising:

a battery array including a cell stack having a first battery cell and a second battery cell that are electrically connected in parallel;

a thermal barrier structure arranged between the first battery cell and the second battery cell; and the thermal barrier structure includes an insulation layer positioned between a first foam layer and a second foam layer, and the insulation layer includes a sheet moulding compound (SMC) or a phenolic sheet.

* * * * *